May 15, 1951          R. D. CLEMSON          2,553,300
SAW FRAME
Filed Feb. 6, 1946
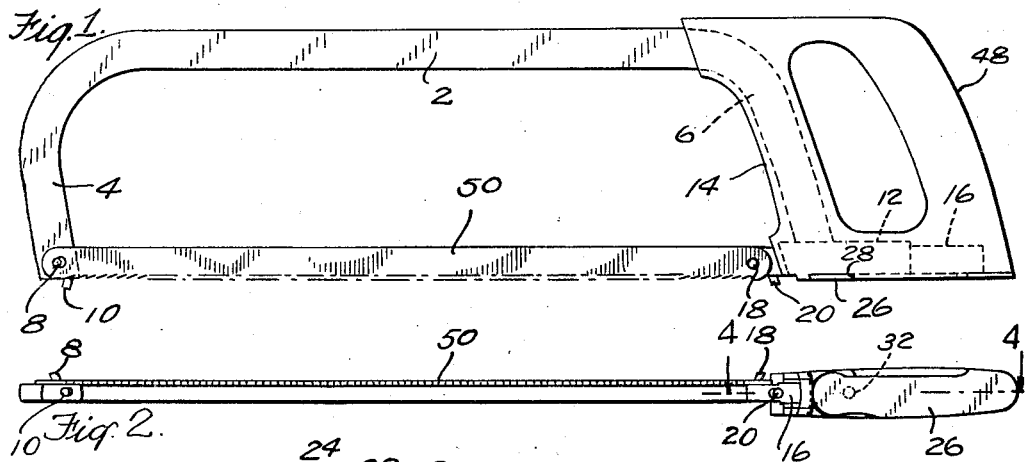
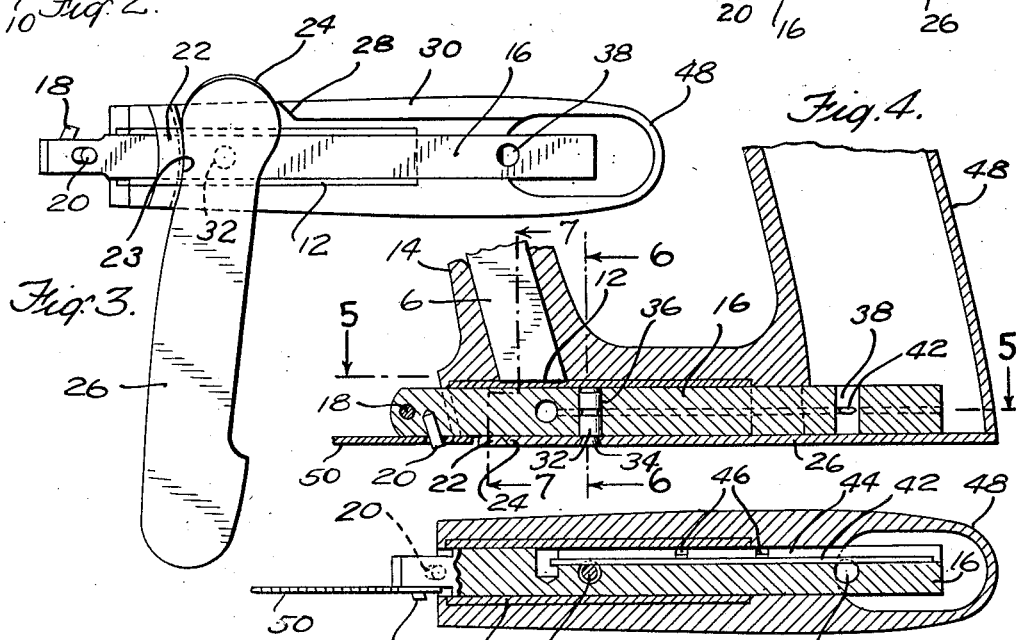
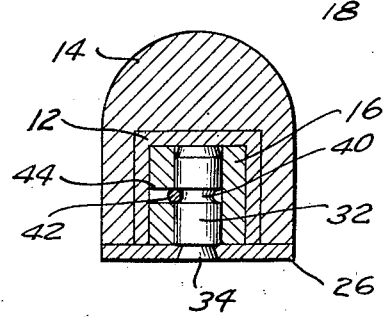
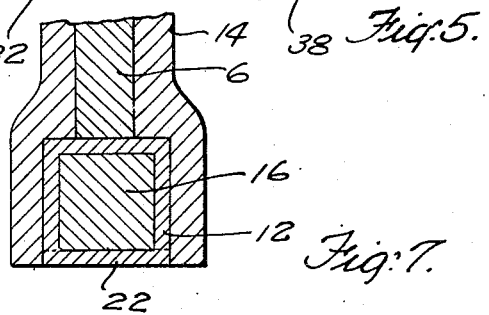
INVENTOR
RICHARD D. CLEMSON.
BY
ATTORNEYS Patented May 15, 1951

2,553,300

UNITED STATES PATENT OFFICE 2,553,300

SAW FRAME

Richard D. Clemson, Middletown, N. Y., assignor to Clemson Bros., Inc., Middletown, N. Y., a corporation of New York Application February 6, 1946, Serial No. 645,821

17 Claims. (Cl. 145—33)

This invention relates to blade-tensioning saw frames for hack saw blades and the like and particularly to blade-tensioning saw frames which are readily adaptable to blades of different standard lengths. More particularly the invention relates to blade-tensioning saw frames of the type which comprises a C-frame with blade anchoring means on one arm, a slide guide connected transversely to the other arm and a slide arranged to move in said guide and having thereon the blade anchor for the associated arm.

In hack saw frames of the aforementioned type, which have a blade anchoring slide arranged to move in a transverse guide-way on one of the blade anchoring arms and which have been provided with means for effecting the movement of the slide to put the blade under tension, it has been customary heretofore to provide for adjustment of the frame to different blade lengths either by providing a telescoping back for the saw frame, lockable in different length adjustments or by providing screw thread adjustments for either or both of the blade anchors to effect a gradual variation in the spacing thereof. Where the telescoping back of the frame has provision for adjustment to certain predetermined blade lengths and the blade tensioning movement of the anchor moving means is of a predetermined amount, uniform tensioning of hack saw blades of different lengths may be obtained. In most of the prior art constructions, however, an anchor carrying slide is moved in a guide on one of the blade anchoring arms, by a screw thread adjustment. It is obvious that the tension exerted upon the blade will in such case be subject to the whim of the user and that therefore the blade will rarely, if ever, be operated at its highest efficiency.

Moreover, when a saw frame of the type to which the invention particularly relates is made adjustable to different blade lengths, either by varying the length of the anchor carrying slide itself or by providing an adjustment for the anchor on the other arm, the resulting frame constructions are usually clumsy, complicated and unsatisfactory because of the excrescences thereon which are necessary for effecting such adjustments and which interfere with the convenient manipulation of the saw, particularly in narrow spaces.

A general object of the present invention therefore is to facilitate the proper adaptation both of the saw frame and of the blade tensioning mechanism to different standard saw blade lengths in order to insure the most efficient tensioning of a blade of any of the lengths which the frame is designed to hold. More particularly the invention aims to provide a blade tensioning saw frame, which has all of the provisions for adjustment to different blade lengths at the handle end of the saw frame and which has both the provisions for adjustment to different blade lengths and the means for effecting the positive blade tensioning and releasing movements so incorporated in the handle structure that the entire structure, when assembled for use, is substantially free from excrescences.

In prior art constructions of the type to which the invention particularly relates it has also been customary to provide slide operating means to effect positive movement of the blade-anchoring slide in the blade tensioning direction but to effect no positive movement in the releasing direction, with the result that it ordinarily requires the use of two hands to remove the blade from the frame. Among the important objects of the present invention, therefore, are the provision, in a blade tensioning saw frame, of improved means both for effecting the tensioning movements of the slide and for positively effecting the releasing movements of the slide.

An important feature of the invention is the arrangement of a cam lever which constitutes a part of the blade-tensioning means so that when closed it becomes a substantially flush part of the handle, and when operated it moves in a plane parallel with and close to the face of the handle. This arrangement of the blade tensioning lever has many advantages, among which are the following:

1. It permits the mounting of the lever upon the bottom or side of the saw frame handle in such manner that it adds little or nothing to the dimensions of the handle or of the saw frame as a whole.

2. It permits connection between the lever and the slide through an opening in the handle in such manner that the lever, when in blade tensioning position, constitutes a part of the closure for the side of the slide guideway through which communication to the slide has been made.

3. It permits such a construction of the cam lever and of the cam bearing that, when in their blade tensioning relation to each other, their exposed faces may be flush with each other and their exposed side and rear edges may be flush with the corresponding sides and/or edges of the handle, thus presenting no excrescences whatever upon the saw frame structure.

4. It permits blade-tensioning and releasing movements of the cam lever which in no way interfere with the hand which is holding the saw handle.

5. In the position in which the saw frame is held during the blade placing or replacing and tensioning operations the transverse tensioning and releasing movements of the cam lever can be more easily effected by the free hand of the operator.

Another important feature of the invention is the arrangement whereby one of the cooperating blade tensioning elements may be bodily moved into different predetermined blade-tensioning relations to the other thereby insuring exact tensioning of blades of each length for which the frame may be adapted. As herein shown this is brought about by bodily movement of the cam lever into different defined fulcrum locations on the anchor carrying slide, while the cam bearing remains fixed. It will be understood, however, that the invention is not restricted to the illustrated manner of effecting bodily such a change in the relation of the cooperating blade tensioning elements.

Other important features and objects of the invention, to which reference has not specifically been directed hereinabove, will appear hereinafter when the following description and claims are considered in connection with the accompanying drawings.

In the specification and the accompanying drawings I have set forth one embodiment of my invention and have suggested various modifications and alternatives. It should be understood that these are not intended to be exhaustive or limiting of the invention, but on the contrary are given with a view to enabling others not only to practice my invention, but so fully to understand it and the principles thereof that they will be enabled readily to modify and adapt these examples and to embody the invention in many forms, each as may be best adapted to the conditions of a particular use.

In the drawings:

Figure 1 is a side elevation of a saw frame embodying the present invention having a saw blade in tensioned position therein;

Figure 2 is a bottom plan view of the structure shown in Figure 1;

Figure 3 is a full scale view of the bottom of the saw frame handle with the parts in their blade-releasing position;

Figure 4 is a section on the line 4—4 of Figure 2;

Figure 5 is a section on the line 5—5 of Figure 4;

Figure 6 is a section on the line 6—6 of Figure 4, and

Figure 7 is a section on the line 7—7 of Figure 4.

In the illustrative embodiment of the invention the main frame is shown as an integral structure formed of resilient heat-treated steel of suitable section and comprising a back 2 and depending arms 4 and 6, the front arm of the frame having thereon outwardly tilted side and bottom blade anchoring pins or studs 8 and 10, respectively. The other arm 6 of the main frame may extend to and be welded directly to the slide guide 12, as shown in Figure 1, or it may stop short of the slide guide 12 and be connected thereto through the transverse bar 14 of the plastic handle within which it is molded and thus securely anchored.

As shown in Figures 3 to 7, inclusive, the slide guide 12 is also molded into the plastic handle of the saw frame, into the bottom portion thereof, and is surrounded on three sides by said plastic handle. The bottom side of the slide guide 12 is open for a purpose presently to be described and is exposed through the open bottom of the handle. The slide 16, carries on one exposed side, and on its bottom blade-anchoring pins or studs 18 and 20, also tilted outwardly from the blade position. This slide is normally confined in the guide 12 by a cam bearing piece 22 welded to the open bottom side of the guide 12, this cross piece 22 serving both to confine the slide 16 in the guide 12 and at its rear edge to provide a bearing 23 against which the cam 24 of the cam lever 26 bears in its blade tensioning movement. The cam surfaces 23 and 24 are sloped, as shown in Figure 4 so that the cam lever 26 is drawn down against the slide and slide guide and is prevented from jumping out of camming engagement.

A second cam bearing 28 is provided on one end of the cam lever stop 30 formed on the bottom of the saw frame handle, the cam bearing 28 cooperating with the cam 24 to effect a positive blade releasing movement of the slide 16.

In the illustrative embodiment of the invention the cam lever 26 is shown as fulcrumed upon the slide 16, provision being made for different fulcrum locations of the cam lever 26 on the slide 16 for different lengths of saw blades. As herein shown, the cam lever carries a fulcrum pin 32 having a reduced part thereof extending through a countersunk opening in the cam lever 26 and riveted there-to as shown at 34. Two spaced pin-receiving openings 36 and 38 are provided in the slide 16, the opening 36 being adapted to receive the cam lever fulcrum pin 32 when the saw frame is to be used with long saw blades and the opening 38 being adapted to receive the fulcrum pin 32 when the frame is to be used with short saw blades.

As shown particularly in Figure 6, the fulcrum pin 32 is provided with an annular groove 40, semi-circular in section, which cooperates with a snap spring 42 to retain the fulcrum pin 32 in either the opening 36 or the opening 38 in the slide 16 while permitting it to turn freely. The snap spring 42 comprises a piece of spring wire of circular section which is inserted in a lateral groove 44 in the side of the slide 16, this groove intersecting the openings 36 and 38 approximately tangentially. The spring wire is held in tensioned relation to each of the openings 36 and 38 by being riveted in position in the groove 44. This rivetting, in the illustrative embodiment, is effected by upsetting the material of the slide on either side of the groove so that it confines the wire 42 closely against the inner wall of the groove, as shown at 46.

As shown more fully in Figures 3, 4 and 5, the metal guide 12 for the slide 16 does not extend entirely through the plastic handle so that when the saw frame is set for use with standard long blades the slide 16 will project beyond the rear end of the guide 12 into the hollow interior of the hand grip portion 48 of the saw frame handle. It will be apparent, however, that in each position of adjustment of the slide 16 there will be a considerable extent of metal guide 12 embracing the slide in the region where the fulcrum is positioned.

From the foregoing description the operation of the device will readily be understood. As shown in Figure 3, the cam lever 26 is in its extreme blade releasing position, that is, in the position in which the blade 50 is positively forced off the inclined studs 8 and 18 or 10 and 20. In moving to this position the cam 24 has engaged the cam bearing 28 and effected a positive forward movement of the slide 16.

The cam lever fulcrum pin 32 being in the fulcrum opening 36, the saw frame is set for receiving the longer of the two blade lengths with which it may be used. To put a blade in operative position in the saw frame the operator will first hook the blade opening in the forward end of the blade 50 over either the anchor pin 8 or the anchor pin 10 on the blade anchoring arm 4 and then will swing the cam lever 26 slightly in the counterclockwise direction in Figure 3 to bring the appropriate anchor pin 18 or 20 into position to enter the rear opening in the blade 50, the cam 24 in this movement of the cam lever 26 cooperating with the cam bearing 23 on the cross piece 22. After the blade 50 has been hooked over the appropriate anchor pin 18 or 20 it will be seen that further movement of the cam lever 26 in the counterclockwise direction will put tension upon the blade 50 by reason of the engagement of the high points of the cam 24 with the cam bearing 23 on the cross piece 22, the amount of this tension being predetermined by the shape and dimensions of the cam 24 and the position of the fulcrum opening 36 in the slide 16 and by the fact that the swinging movement of the cam lever 26 is limited by the stop 30 on the bottom of the saw frame handle. In this position the cam is just past dead center.

When the cam lever 26 has been swung until it is in engagement with the stop 30, it will be seen that the exposed edges of the cam lever 26 then lie substantially flush with the corresponding boundary edges of the saw frame handle and thus there is no projection from the width of the saw frame which will either interfere with the operation of the saw or which is even noticeable. It will further be seen that, by reason of the fact that the cam lever 26 is of flat plate-like construction and has its bottom face lying flush with the bottom face of the cross piece 22 on which the cam bearing 23 is formed, there is no downward projection from the saw frame that either can interfere with the work or is noticeable. Moreover, by reach of the location of the cam lever 26 so that it moves in a plane transverse to the plane of the saw frame and by reason of its mounting upon the slide 16 in face engagement therewith, the overall dimensions of the blade tensioning mechanism are reduced to a minimum while at the same time the parts thereof to be manipulated are located most conveniently.

When it is desired to adapt the frame for use with short blades it will be seen that, if the cam lever 26 be turned into the position shown in Figure 3, the operator, by taking hold of each of the projections thereof over the sides of the handle, can lift the cam lever fulcrum pin 32 axially out of the opening 36, forcing out the spring 42 and the slide 16 can then be moved to bring the opening 38 into the position formerly occupied by the opening 36 and the fulcrum pin 32 inserted into the opening 38 where it will be held by the action of the spring 42 snapping into retaining position in the annular groove 40.

I claim:

1. A blade tensioning saw frame for hack saws and the like having, in combination, a stiff resilient main frame comprising blade anchoring arms and a connecting back, a slide guide connected transversely to one of said arms, a slide arranged to move in said guide toward and away from the other of said arms and having thereon the blade anchor for said one arm, and a cam lever adapted to effect a pre-determined blade tensioning movement of said slide in its guide; said lever being fulcrumed on one of said parts and there being a cam bearing on another of said parts, said lever being selectively movable into different fulcrum locations on said one part while the cam bearing on the other part remains fixed.

2. A blade tensioning saw frame for hack saws and the like having, in combination, a stiff resilient main frame comprising blade anchoring arms and a connecting back, a slide guide connected transversely to one of said arms, a slide arranged to move in said guide toward and away from the other of said arms and having thereon the blade anchor for said one arm, and a cam lever adapted to effect a pre-determined blade tensioning movement of said slide in its guide; said slide being provided with a plurality of fulcrum locations for the cam lever for accommodating different blade lengths, and the cam bearing having a fixed location on the guide.

3. A blade tensioning saw frame for back saws and the like having, in combination, a stiff resilient main frame comprising blade anchoring arms and a connecting back, a slide guide connected transversely to one of said arms, a slide arranged to move in said guide toward and away from the other of said arms and having thereon the blade anchor for said one arm, and a cam lever adapted to effect a pre-determined blade tensioning movement of said slide in its guide; said cam lever being provided with a fulcrum pin and said slide being provided with spaced holes for receiving said fulcrum pin, whereby the position of the slide can be adjusted for tensioning blades of different lengths.

4. A blade tensioning saw frame for hack saws and the like having, in combination, a stiff resilient main frame comprising blade anchoring arms and a connecting back, a slide guide connected transversely to one of said arms, a slide arranged to move in said guide toward and away from the other of said arms and having thereon the blade anchor for said one arm, and a cam lever adapted to effect a pre-determined blade tensioning movement of said slide in its guide; said part on which the cam lever is fulcrumed being provided with a plurality of fulcrum points for different blade lengths, and each fulcrum point including a detent arranged to facilitate quick mounting and demounting of said cam lever at a selected fulcrum.

5. A blade tensioning saw frame for hack saws and the like having, in combination, a stiff resilient main frame comprising blade anchoring arms and a connecting back, a slide guide connected transversely to one of said arms, a slide arranged to move in said guide toward and away from the other of said arms and having thereon the blade anchor for said one arm, and a cam lever adapted to effect a predetermined blade tensioning movement of said slide in its guide; said saw frame including a handle in which the slide guide is located, and the cam lever and cam bearing when in blade tensioning relationship together forming a cover over the bottom and lying within the edges of the handle.

6. A blade tensioning saw frame for hack saws and the like having, in combination, a stiff resilient main frame comprising blade anchoring arms and a connecting back, a slide guide connected transversely to one of said arms, a slide arranged to move in said guide toward and away from the other of said arms and having thereon the blade anchor for said one arm, and a cam lever adapted to effect a predetermined blade tensioning movement of said slide in its guide; said slide guide having an open bottom across which the cam bearing extends, and the cam lever being fulcrumed on the slide in face engagement therewith for movement in a plane transverse to the plane of the saw frame, between a blade tensioning position in which it forms with the cam bearings a closure for said guide, and a blade releasing position transverse thereto.

7. A blade tensioning saw frame for hack saws and the like having, in combination, a stiff resilient main frame comprising blade anchoring arms and a connecting back, a slide arranged to move in said guide toward and away from the other of said arms and having thereon the blade anchor for said one arm, and a cam lever adapted to effect a predetermined blade tensioning movement of said slide in its guide; said slide guide having an open bottom across which the cam bearing extends, the cam lever being fulcrumed on the slide in face engagement therewith for movement in a plane transverse to the plane of the saw frame, between a blade tensioning position in which it forms with the cam bearing a closure for said guide, and a blade releasing position transverse thereto, and said slide having thereon spaced fulcrum mountings for said cam lever to adapt the tensioning means to blades of different lengths.

8. A blade tensioning frame for hack saws and the like including a steel back member terminating in a downwardly extending front arm, a blade hook on said front arm, and a handle assembly combined with and extending rearwardly from said back member; said handle assembly comprising a substantially vertically extending smoothly configured grip portion, a transverse bar spaced forwardly of and substantially parallel to said grip portion and separated therefrom by a distance sufficient to form a hand clearance opening therebetween, and a base rigidly joining and extending between said grip portion and said transverse bar; said handle assembly forming a narrow housing extending substantially in the plane of a tensioned hack saw blade, a cam blade tensioning member of predetermined movement substantially concealed within said housing, an exteriorly accessible blade hook on said tensioning member, a pivot pin bearing on said member, and a tensioning lever supporting said pivot pin and bearing on a part of said assembly; said lever when in tensioning position being substantially coextensive with a portion of said base, and said lever being pivotally movable to a nontensioning position wherein said pivot pin and said tensioning member approach the front blade hook.

9. A blade-tensioning saw frame for hack saws and the like having, in combination, a resilient main frame comprising blade-anchoring arms and a connecting back, a slide guide connected transversely to one of said arms, a slide arranged to move in said guide and having thereon a blade anchor, and a cam lever arranged to effect a predetermined blade-tensioning movement of said slide in its guide, said lever being fulcrumed on said slide and having a cam bearing on said guide, one of said cooperating blade-tensioning parts being the slide and said slide being bodily movable into different predetermined positions relative to said cam lever whereby to receive said blade-tensioning movement for different blade lengths.

10. A blade-tensioning saw frame for hack saws and the like having, in combination, a resilient main frame comprising blade-anchoring arms and a connecting back, a slide guide connected transversely to one of said arms, a slide arranged to move in said guide and having thereon a blade anchor, and a cam lever arranged to effect a predetermined blade-tensioning movement of said slide in its guide, said cam lever being fulcrumed to move in a plane transverse to the plane of the saw frame, said lever being fulcrumed on one of said parts and having a cam bearing on the other part, one of said cooperating blade-tensioning parts being the slide and said slide being bodily movable into different predetermined positions relative to said cam lever whereby to receive said blade-tensioning movement for different blade lengths.

11. A blade-tensioning saw frame according to claim 10 having a handle into which the slide guide extends, and the cam lever being dimensioned to lie within the lateral boundaries of the handle when in its tension-retaining position.

12. A blade-tensioning saw frame for hack saws and the like, having, in combination, a resilient main frame comprising blade-anchoring arms and a connecting back, a slide guide connected transversely to one of said arms, a slide arranged to move in said guide and having thereon a blade anchor, and a cam lever arranged to effect a predetermined blade-tensioning movement of said slide in its guide, said lever being fulcrumed on one of said parts and having a cam bearing on the other part, said other part also having an auxiliary cam bearing which cooperates with the cam lever to effect a positive blade-releasing movement of the slide, one of said cooperating blade-tensioning parts being the slide and said slide being bodily movable into different predetermined positions relative to said cam lever whereby to receive said blade-tensioning movement for different blade lengths.

13. A blade-tensioning saw frame for hack saws and the like having, in combination, a resilient main frame comprising blade-anchoring arms and a connecting back, a slide guide connected transversely to one of said arms, a slide arranged to move in said guide and having thereon a blade anchor, and a cam lever arranged to effect a predetermined blade-tensioning movement of said slide in its guide, said lever being fulcrumed on one of said parts and having a cam bearing on the other part, one of said cooperating blade-tensioning parts being the slide and said slide being bodily movable into different predetermined positions relative to said cam lever whereby to receive said blade-tensioning movement for different blade lengths, said cam lever and cam bearing together forming a closure for one side of said slide guide.

14. A blade tensioning saw frame for hack saws and the like having, in combination, a resilient main frame comprisng blade-anchoring arms and a connecting back, a slide guide connected transversely to one of said arms, a slide arranged to move in said guide and having thereon the blade anchor, a cam lever arranged to effect a predetermined blade-tensioning movement of said slide in its guide, said lever being fulcrumed on one of said parts and having a cam bearing on the other part, one of said cooperating blade-tensioning parts being the slide and said slide being bodily movable into different predetermined positions relative to said cam lever whereby to receive said blade-tensioning movement for different blade lengths, and a handle in which the said slide guide is located, the cam lever and cam bearing together forming a flush portion of one face of, and within the edges of the handle, when in blade-tensioning relation.

15. A blade-tensioning saw frame for hack saws and the like having, in combination, a resilient main frame comprising blade-anchoring arms and a connecting back, a slide guide connected transversely to one of said arms, a slide arranged to move in said guide and having thereon a blade anchor, a cam lever arranged to effect a predetermined blade-tensioning movement of said slide in its guide, said lever being fulcrumed on said slide and having a cam bearing on said guide, one of said cooperating blade-tensioning parts being the slide and said slide being bodily movable into different predetermined positions relative to said cam lever whereby to receive said blade-tensioning movement for different blade lengths, a handle in which the slide guide is located, the cam lever being fulcrumed to move in a plane transverse to the plane of the saw frame and forming with the cam bearing a closure for the bottom side of the slide guide, and a stop on the handle bottom limiting the blade-tensioning movement of the cam lever, the bottom faces of said cam lever, cam bearing and stop being flush with each other and the exposed lateral and rear edges thereof being flush with the corresponding edges of the handle bottom when the cam lever is in its blade-tensioning position.

16. A blade-tensioning hack saw frame comprising a blade-anchoring arm, a connecting back, and a combined second blade-anchoring arm and handle, an elongated blade-anchoring slide, a blade-anchoring pin on said blade-anchoring arm and another blade-anchoring pin on said anchoring slide near one end thereof, at least two transverse, longitudinally spaced holes in said slide, a guide for said slide formed in the combined handle and anchoring arm, said handle extending far enough to cover the end of said slide remote from the blade when the frame is fitted to the longest blade for which it is adapted, a pin removably receivable in any selected one of said transverse holes in said slide and long enough to extend a short distance beyond the face of said slide, a cam connecting the end of said pin and the combined handle and anchoring arm so as to move the slide relative thereto and apply tension to the blade, and a cam-operating handle shaped to lie close against the frame when the cam is in blade-tightening position 17. A blade-tensioning hack saw as defined in claim 16 in which the removable pin is provided with a peripheral groove and a spring wire is mounted in the anchoring slide in such a position as to intersect the edges of the transverse holes and cooperate with the groove in the pin when the pin is in one of the transverse holes, to hold the pin in position in the hole.

RICHARD D. CLEMSON.

REFERENCES CITED

The following references are of record in the file of this patent:

UNITED STATES PATENTS

| Number | Name | Date |
|---|---|---|
| 156,110 | Whitcomb | Oct. 20, 1874 |
| 278,935 | Griffin | June 5, 1883 |
| 739,457 | Tilden | Sept. 22, 1903 |
| 833,569 | Adamkiewitz | Oct. 16, 1906 |
| 864,166 | Herrick | Aug. 27, 1907 |
| 1,281,148 | Driver | Oct. 8, 1918 |
| 1,302,643 | Driver | May 6, 1919 |
| 1,417,196 | Ochoa | May 23, 1922 |
| 1,486,391 | Ross | Mar. 11, 1924 |
| 1,517,827 | De Grado | Dec. 2, 1924 |
| 1,699,291 | Halbert | Jan. 15, 1929 |
| 1,885,128 | Montgomery | Nov. 1, 1932 |
| 2,308,354 | Clemson | June 12, 1943 |
| 2,332,545 | Acomb | Oct. 26, 1943 |

FOREIGN PATENTS

| Number | Country | Date |
|---|---|---|
| 31,619 | Switzerland | Oct. 17, 1904 |